US008848122B2

(12) United States Patent
Jung et al.

(10) Patent No.: US 8,848,122 B2
(45) Date of Patent: Sep. 30, 2014

(54) DISPLAY APPARATUS

(75) Inventors: Kwang-chul Jung, Seongnam-si (KR);
Chongchul Chai, Seoul (KR);
Kyoungju Shin, Hwaseong-si (KR);
Joon-Chul Goh, Hwaseong-si (KR);
Young-Soo Yoon, Anyang-si (KR)

(73) Assignee: Samsung Display Co., Ltd., Yongin, Gyeonggi-do (KR)

( * ) Notice: Subject to any disclaimer, the term of this patent is extended or adjusted under 35 U.S.C. 154(b) by 340 days.

(21) Appl. No.: 13/305,368

(22) Filed: Nov. 28, 2011

(65) Prior Publication Data

US 2012/0293736 A1 Nov. 22, 2012

(30) Foreign Application Priority Data

May 19, 2011 (KR) .................. 10-2011-0047454

(51) Int. Cl.
*G02F 1/1343* (2006.01)
*G02F 1/136* (2006.01)

(52) U.S. Cl.
USPC .............................................. 349/39; 349/48

(58) Field of Classification Search
USPC ..................................................... 349/39, 48
See application file for complete search history.

(56) References Cited

U.S. PATENT DOCUMENTS

| 7,286,200 | B2 | 10/2007 | Inoue et al. | |
|---|---|---|---|---|
| 2004/0263710 | A1* | 12/2004 | Song et al. | 349/44 |
| 2008/0284391 | A1 | 11/2008 | Al-Shyoukh et al. | |
| 2009/0027324 | A1 | 1/2009 | Hsu et al. | |
| 2009/0096730 | A1* | 4/2009 | Jung et al. | 345/87 |
| 2010/0014012 | A1* | 1/2010 | Irie et al. | 349/39 |
| 2010/0045883 | A1* | 2/2010 | Kim et al. | 349/37 |

FOREIGN PATENT DOCUMENTS

KR 1020040079475 9/2004

* cited by examiner

*Primary Examiner* — Dennis Y Kim
(74) *Attorney, Agent, or Firm* — F. Chau & Associates, LLC

(57) ABSTRACT

A display apparatus includes a plurality of pixels. At least one of the pixels includes a gate line, a data line, a first storage line spaced apart from the gate line, a second storage line spaced apart from the gate line and the first storage line, first and second switching devices electrically connected to the gate line and the data line, a first liquid crystal capacitor connected to the first switching device and including the liquid crystal layer as its dielectric substance, a second liquid crystal capacitor connected to the second switching device and including the liquid crystal layer as its dielectric substance, a first storage capacitor connected between the first switching device and one of the first and second storage lines, and a second storage capacitor connected between the second switching device and a remaining one of the first and second storage lines.

21 Claims, 7 Drawing Sheets

DISPLAY APPARATUS

CROSS-REFERENCE TO RELATED APPLICATION

This application claims priority to Korean Patent Application No. 10-2011-0047454 filed on May 19, 20011, the contents of which are herein incorporated by reference in its entirety.

BACKGROUND

1. Technical Field

The embodiments of the present invention relate to a display apparatus. More particularly, the embodiments of the present invention relate to a display apparatus capable of improving side visibility.

2. Discussion of the Related Art

In general, a liquid crystal display includes a display panel that receives light to display an image and a backlight unit that provides the light to the display panel. The liquid crystal display displays the image using a variation of light transmission of liquid crystals, and thus the liquid crystal display has a relatively narrow viewing angle.

In order to improve the viewing angle of the liquid crystal display, a method of dividing one pixel into two sub-pixels, e.g., first and second sub-pixels, and applying different voltages to the first and second sub-pixels has been suggested. The first and second sub-pixels have different areas from each other, which renders it difficult to drive the liquid crystal display in a dot inversion manner.

SUMMARY

Exemplary embodiments of the present invention provide a display apparatus capable of improving side visibility.

According to an exemplary embodiment, a display apparatus includes a first substrate, a second substrate facing the first substrate, a liquid crystal layer disposed between the first substrate and the second substrate and including liquid crystal molecules, and a plurality of pixels.

At least one pixel of the pixels includes a gate line extended in a first direction, a data line extended in a second direction crossing the first direction, a first storage line, a second storage line, a first switching device, a second switching device, a first liquid crystal capacitor, a second liquid crystal capacitor, a first storage capacitor, and a second storage capacitor.

The first storage line is extended in the first direction and spaced apart from the gate line. The second storage line is extended in the first direction and spaced apart from the gate line and the first storage line. The first switching device is electrically connected to the gate line and the data line, and the second switching device is electrically connected to the gate line and the data line. The first liquid crystal capacitor is connected to the first switching device and includes the liquid crystal layer as a dielectric substance. The second liquid crystal capacitor is connected to the second switching device and includes the liquid crystal layer as a dielectric substance. The first storage capacitor is connected to the first switching device and one of the first and second storage lines, and the second storage capacitor is connected to the second switching device and the other one of the first and second storage lines.

The first storage capacitor included in one of two pixels adjacent to each other in the first direction is connected between the first switching device and the first storage line. The first storage capacitor included in the other one of the two pixels adjacent to each other in the first direction is connected between the first switching device and the second storage line.

The data voltage applied to the first and second pixel electrodes may be changed to a relatively high data voltage or a relatively low data voltage according to the voltage applied to the first and second storage lines to display one gray scale, thereby improving a viewing angle of the display apparatus. In addition, an area ratio of the first and second pixel electrodes may be easily changed, to thereby improve the viewing angle and display quality of the display apparatus.

BRIEF DESCRIPTION OF THE DRAWINGS

The embodiments of the present invention will become readily apparent by reference to the following detailed description when considered in conjunction with the accompanying drawings wherein.

DETAILED DESCRIPTION

It will be understood that when an element or layer is referred to as being "on", "connected to" or "coupled to" another element or layer, it can be directly on, connected or coupled to the other element or layer or intervening elements or layers may be present. Like numbers may refer to like elements throughout the drawings and the specification.

Figure 1:
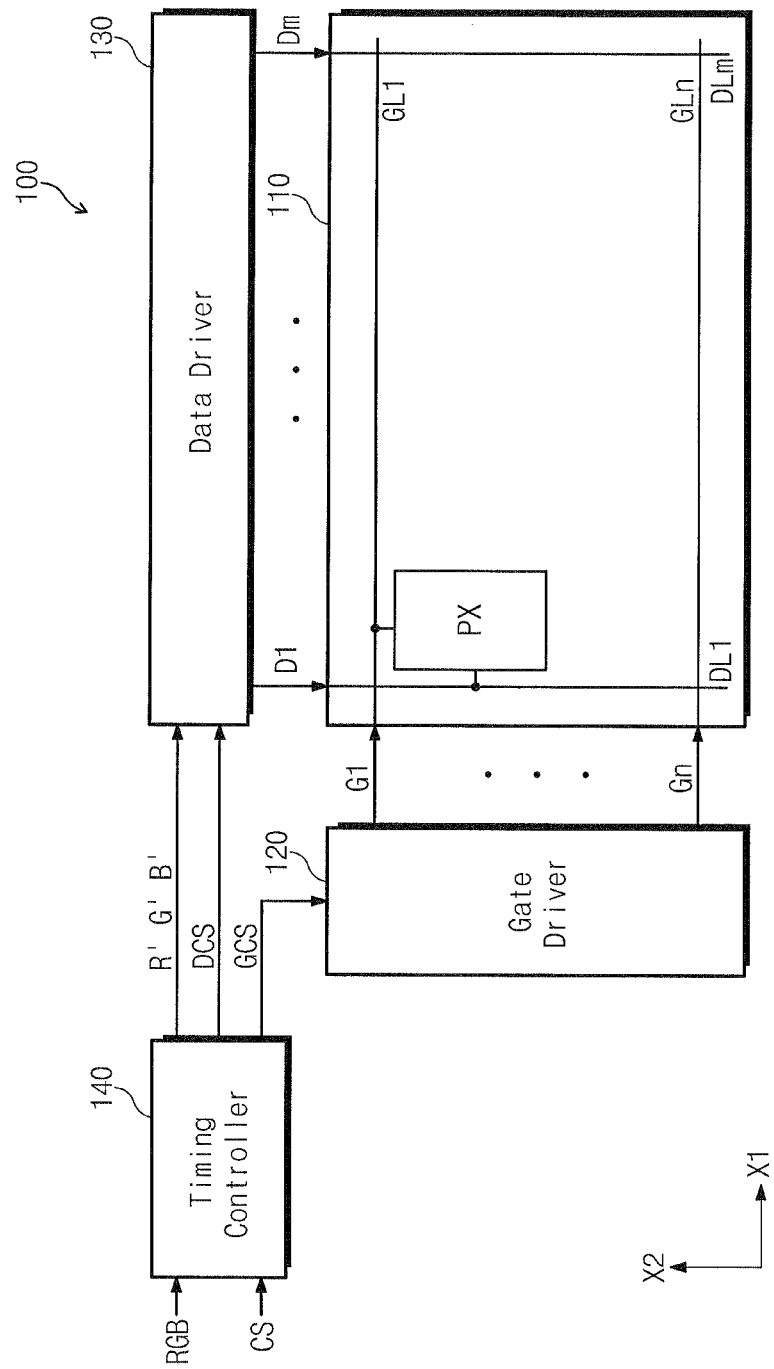
FIG. 1 is a block diagram showing a display apparatus according to an exemplary embodiment of the present invention.

FIG. 1 is a block diagram showing a display apparatus according to an exemplary embodiment of the present invention.

Referring to FIG. 1, a display apparatus 100 includes a display panel 110, a gate driver 120, a data driver 130, and a timing controller 140.

The timing controller 140 receives source image signals RGB and control signals CS from an external device (not shown). The timing controller 140 converts a data format of the source image signals RGB into a data format appropriate for an interface between the data driver 130 and the timing controller 140 and provides the converted image signals R'G'B' to the data driver 130. The timing controller 140 applies data signals DCS, such as an output start signal, a horizontal start signal, a polarity inversion signal, etc., to the data driver 130. The timing controller 140 applies gate control signals GCS, such as a vertical start signal, a vertical clock signal, a vertical clock bar signal, etc., to the gate driver 120.

The gate driver 120 sequentially outputs gate signals G1 to Gn in response to the gate control signals GCS from the timing controller 140.

The data driver 130 converts the image signals R'G'B' into data voltages D1 to Dm in response to the data control signals DCS from the timing controller 140. The data voltages D1 to Dm output from the data driver 130 are applied to the display panel 110.

The display panel 110 includes a plurality of gate lines GL1 to GLn extended in a first direction X1, a plurality of data lines DL1 to DLm extended in a second direction X2 different from the first direction X1 to cross the gate lines GL1 to GLn, and a plurality of pixels PX each connected to a corresponding gate line of the gate lines GL1 to GLn and a corresponding data line of the data lines DL1 to DLm.

The gate lines GL1 to GLn are connected to the gate driver 120, and the data lines DL1 to DLm are connected to the data driver 130. The gate lines GL1 to GLn receive the gate signals G1 to Gn provided from the gate driver 120, and the data lines DL1 to DLm receive the data voltages D1 to Dm provided from the data driver 130.

In FIG. 1, one pixel area PX has been shown, which will be described in detail with reference to FIG. 2. Although not shown in FIG. 1, the display panel 110 includes a plurality of first signal lines spaced apart from the gate lines GL1 to GLn and extended in the first direction X1 and a plurality of second signal lines spaced apart from the gate lines GL1 to GLn and the first signal lines and extended in the first direction X1.

Although not shown in FIG. 1, the display apparatus 100 further includes a backlight unit disposed adjacent to the display panel 110 to provide light to the display panel 110. The backlight unit includes a plurality of light sources emitting light.

Figure 2:
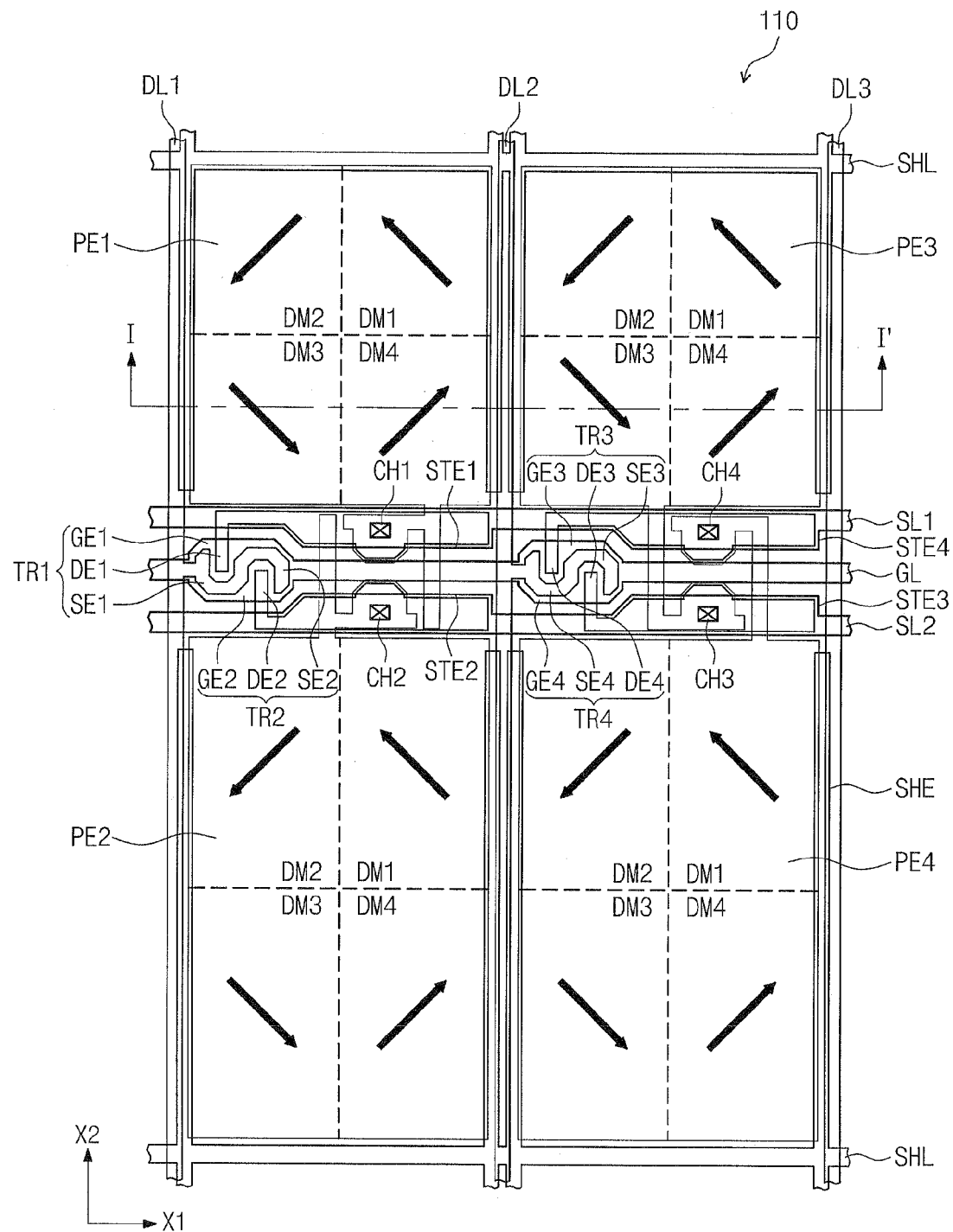
FIG. 2 is an enlarged plan view showing the display panel shown in FIG. 1.

FIG. 2 is an enlarged plan view showing the display panel shown in FIG. 1. FIG. 2 shows two pixel areas to describe a pixel configuration of the display panel 110 shown in FIG. 1.

Referring to FIG. 2, the display panel 110 includes a gate line GL extended in the first direction X1, first, second, and third data lines DL1, DL2, and DL3 extended in the second direction X2 crossing the first direction X1 and spaced apart from each other, a first storage line SL1 extended in the first direction X1 and spaced apart from the gate line GL, and a second storage line SL2 extended in the first direction X1 and spaced apart from the gate line GL and the first storage line SL1.

The display panel 110 further includes first and second thin film transistors TR1 and TR2 connected to the gate line GL and the first data line DL1 and third and fourth thin film transistors TR3 and TR4 connected to the gate line GL and the second data line DL2.

The first thin film transistor TR1 includes a first gate electrode GE1 branched from the gate line GL, a first source electrode SE1 branched from the first data line DL1, and a first drain electrode DE1 spaced apart from the first source electrode SE1. The second thin film transistor TR2 includes a second gate electrode GE2 branched from the gate line GL, a second source electrode SE2 connected to the first data line DL1 through the first source electrode SE2, and a second drain electrode DE2 spaced apart from the second source electrode SE2.

The third thin film transistor TR3 includes a third gate electrode GE3 branched from the gate line GL, a third source electrode SE3 connected to the second data line DL2, and a third drain electrode DE3 spaced apart from the third source electrode SE3. The fourth thin film transistor TR4 includes a fourth gate electrode GE4 branched from the gate line GL, a fourth source electrode SE4 connected between the second data line DL2 and the third source electrode SE3, and a fourth drain electrode DE4 spaced apart from the fourth source electrode SE4.

The first drain electrode DE1 is connected to a first pixel electrode PE1 through a first contact hole CH1, the second drain electrode DE2 is connected to a second pixel electrode PE2 through a second contact hole CH2, and the first and second pixel electrodes PE1 and PE2 are disposed in one pixel area. The third drain electrode DE3 is connected to a third pixel electrode PE3 through a third contact hole CH3, the fourth drain electrode DE4 is connected to a fourth pixel electrode PE4 through a fourth contact hole CH4, and the third and fourth pixel electrodes PE3 and PE4 are disposed in another pixel area.

The display panel 110 includes a first storage electrode STE1 connected to the first storage line SL1 to face the first drain electrode DE1, a second storage electrode STE2 connected to the second storage line SL2 to face the second electrode DE2, a third storage electrode STE3 connected to the second storage line SL2 to face the third drain electrode DE3, and a fourth storage electrode STE4 connected to the first storage line SL1 to face the fourth drain electrode DE4.

The first and forth storage electrodes STE1, STE4 may be branched from the first storage line SL1 to face the first and forth drain electrodes DE1, DE4, respectively. Also the second and third storage electrodes STE2, STE3 may be branched from the second storage line SL2 to face the second and third drain electrodes DE2, DE3, respectively.

As shown in FIG. 2, when a portion of the first pixel electrode PE1 and a portion of the second pixel electrode PE2 are extended to the second storage electrode STE2 and the first storage electrode STE1, an area in which the first pixel electrode PE1 overlaps the first and second storage electrodes STE1 and STE2 is the same or substantially the same as an area in which the second pixel electrode PE2 overlaps the first and second storage electrodes STE1 and STE2. An area in which each of the first and second pixel electrodes PE1 and PE2 overlaps the first and second storage electrodes STE1 and STE2 is the same or substantially the same as an area in which each of the third and fourth pixel electrodes PE3 and PE4 overlaps the third and fourth storage electrodes STE3 and STE4. Further, an area in which the third pixel electrode PE3 overlaps the third and fourth storage electrodes STE3 and STE4 is the same or substantially the same as an area in which the fourth pixel electrode PE4 overlaps the third and fourth storage electrodes STE3 and STE4. Thus, electrical influences to the first to fourth pixel electrodes PE1 to PE4 by signals applied to the first and second storage lines SL1 and SL2 may be uniform.

When viewed in a plan view, the area in which the first pixel electrode PE1 overlaps the first and second drain electrodes DE1 and DE2 is the same or substantially the same as the area in which the second pixel electrode PE2 overlaps the first and second drain electrodes DE1 and DE2.

Each of the first to fourth pixel electrodes PE1 to PE4 is divided into a first domain DM1, a second domain DM2, a third domain DM3, and a fourth domain DM4, and an alignment direction of an alignment layer (not shown in FIG. 2) corresponding to each of the first to fourth domains DM1 to DM4 has been represented by arrows in FIG. 2.

The display panel 110 further includes a shield line SHL and a shield electrode SHE. The shield line SHL is extended in the first direction X1 and spaced apart from the gate line GL and the first and second storage lines SL1 and SL2, and the shield electrode SHE is branched from the shield line SHL and extended in the second direction X2.

The shield electrode SHE is disposed between the first to fourth pixel electrodes PE1 to PE4 and the first to third data lines DL1 to DL3 to prevent electrical influences to the first to fourth pixel electrodes PE1 to PE4, which are caused by signals applied to the first to third data lines DL1 to DL3.

As shown in FIG. 2, the shield line SHL is disposed on the first and third pixel electrodes PE1 and PE3 and under the second and fourth pixel electrodes PE2 and PE4.

According to the structure shown in FIG. 2, an area of the first and third pixel electrodes PE1 and PE3, which display a high gray-scale brightness portion, is different from an area of the second and fourth pixel electrodes PE2 and PE4, which display a low gray-scale brightness portion, thereby improving the viewing angle of the display apparatus 100. According to an embodiment, an area ratio of the first pixel electrode PE1 to the second pixel electrode PE2 is 1:1.5 to 1:2, and an area ratio of the third pixel electrode PE3 to the fourth electrode PE4 is 1:1.5 to 1:2. However, the area ratio between the first and second pixel electrodes PE1 and PE2 and between the third and fourth pixel electrodes PE3 and PE4 is not limited to the above range.

Figure 3:
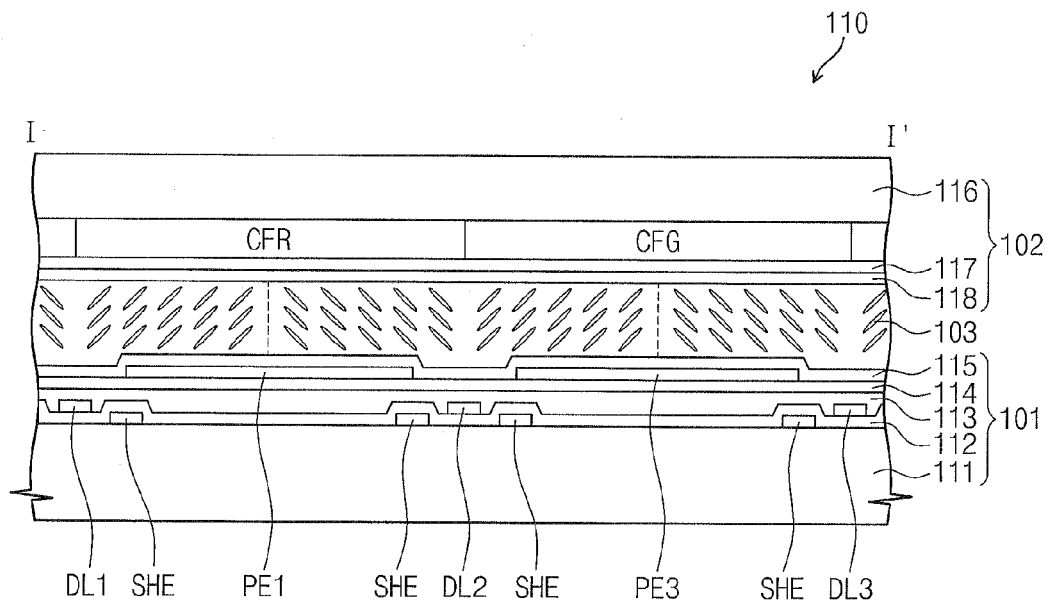
FIG. 3 is a cross-sectional view taken along line I-I' shown in FIG. 2.

FIG. 3 is a cross-sectional view taken along line I-I' shown in FIG. 2.

Referring to FIG. 3, the display panel 110 includes a first substrate 101, a second substrate 102 facing the first substrate 101, and a liquid crystal layer 103 between the first and second substrates 101 and 102.

The first substrate 101 includes a first base substrate 111 and the shield electrode SHE disposed on the first base substrate 111. Although not shown in FIG. 3, the gate line GL (shown in FIG. 2) is disposed on the first base substrate 111.

A first insulating layer 112 is disposed on the first base substrate 111 and the shield electrode SHE. The first insulating layer 112 includes an oxide, a nitride, or a transparent insulating material. For example, the first insulating layer 112 includes silicon nitride (SiNx) or silicon oxide (SiOx).

The first to third data lines DL1 to DL3 are disposed on the first insulating layer 112, and a second insulating layer 113 is disposed on the first to third data lines DL1 to DL3 and the first insulating layer 112. The second insulating layer 113 includes an oxide, a nitride, or a transparent insulating material. For example, the first insulating layer 112 includes silicon nitride (SiNx) or silicon oxide (SiOx).

A third insulating layer 114 is disposed on the second insulating layer 113. The third insulating layer 114 is formed of an organic material. Although not shown in FIG. 3, the second and third insulating layers 113 and 114 cover the first to fourth thin film transistors TR1 to TR4.

The first and third pixel electrodes PE1 and PE3 are disposed on the third insulating layer 114 to be spaced apart from each other. A first alignment layer 115 is disposed on the first and third pixel electrodes PE1 and PE3.

The second substrate 102 includes a second base substrate 116 and color filters CFR and CFG disposed on the second base substrate 116. FIG. 3 shows a red color filter CFR displaying a red color and a green color filter CFG displaying a green color as an example.

A common electrode 117 is disposed on the color filters CFR and CFG to face the first and third pixel electrodes PE1 and PE3 to form an electric field in the liquid crystal layer 103. In FIG. 3, the common electrode 117 is disposed on the second substrate 102, but the common electrode 117 may be disposed on the first substrate 101 according to an embodiment. A second alignment layer 118 is disposed on the common electrode 117.

The liquid crystal layer 103 is disposed between the first and second alignment layers 115 and 118. The liquid crystal layer 103 includes a plurality of liquid crystal molecules, and the liquid crystal molecules are aligned with a predetermined pre-tilt angle, for example, about 85 degrees to about 89 degrees, according to the alignment direction of the first and second alignment layers 115 and 118. In FIG. 3, the liquid crystals are vertically aligned, but it is not be limited thereto or thereby.

Referring again to FIGS. 2 and 3, each of the first to fourth pixel electrodes PE1 to PE4 is divided into the first to fourth domains DM1 to DM4, and the first and second alignments layers 115 and 118 corresponding to the first to fourth domains DM1 to DM4 are aligned in different directions from each other. Thus, the liquid crystal molecules in each of the first to fourth domains DM1 to DM4 between the first and second alignment layers 115 and 118 are pre-tilted in a direction corresponding to a vector sum of an alignment direction of the first alignment layer 115 and an alignment direction of the second alignment layer 118. The alignment directions of the first and second alignment layers 115 and 118 are described in detail with reference to FIGS. 6A to 6C FIG. 4 is a circuit diagram corresponding to the display panel shown in FIG. 2.

Figure 4:
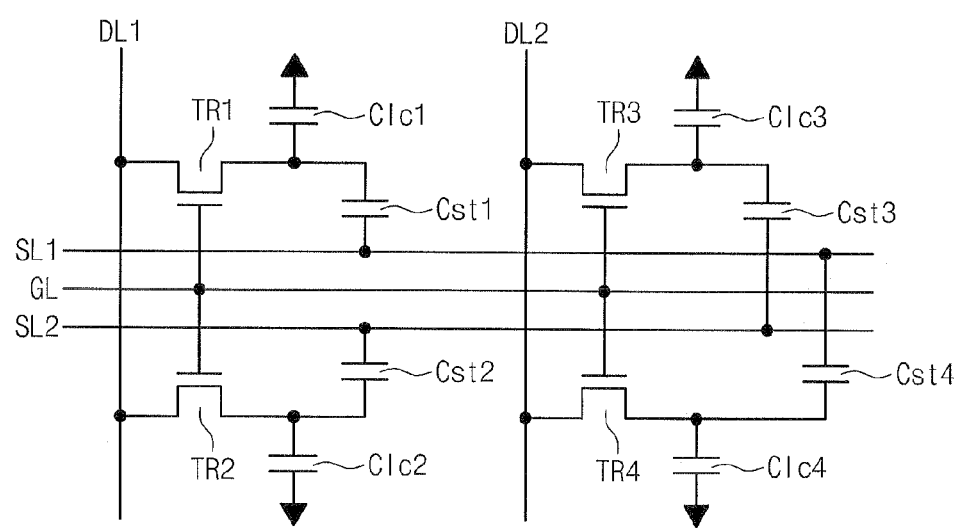
FIG. 4 is a circuit diagram corresponding to the display panel shown in FIG. 2.

Referring to FIGS. 2 to 4, the first and second thin film transistors TR1 and TR2 are connected to the gate line GL and the first data line DL1, and the third and fourth thin film transistors TR3 and TR4 are connected to the gate line GL and the second data line DL2.

The first pixel electrode PE1 and the common electrode 117 form a first liquid crystal capacitor C1c1, the second pixel electrode PE2 and the common electrode 117 form a second liquid crystal capacitor C1c2, the third pixel electrode PE3 and the common electrode 117 form a third liquid crystal capacitor C1c3, and the fourth pixel electrode PE4 and the common electrode 117 form a fourth liquid crystal capacitor C1c4. The first to fourth liquid crystal capacitors C1c1 to C1c4 include the liquid crystal layer 103 as their dielectric substance.

According to an embodiment, the first liquid crystal capacitor C1c1 has a capacitance smaller than a capacitance of the second liquid crystal capacitor C1c2. As an example, a capacitance ratio of the first liquid crystal capacitor C1c1 to the second liquid crystal capacitor C1c2 is 1:1.5 to 1:2.

Referring to FIGS. 2 to 4, the first drain electrode DE1 and the first storage electrode STE1 facing the first drain electrode DE1 form a first storage capacitor Cst1, the second drain electrode DE2 and the second storage electrode STE2 facing the second drain electrode DE2 form a second storage capacitor Cst2, the third drain electrode DE3 and the third storage electrode STE3 facing the third drain electrode DE3 form a third storage capacitor Cst3, and the fourth drain electrode DE4 and the fourth storage electrode STE4 facing the fourth drain electrode DE4 form a fourth storage capacitor Cst4. The first to fourth storage capacitors Cst1 to Cst4 include the first insulating layer 112 as their dielectric substance.

According to an embodiment, a capacitance ratio of the second liquid crystal capacitor C1c2 to the first liquid crystal capacitor C1c1 is equal to a capacitance ratio of the second storage capacitor Cst2 to the first storage capacitor Cst1. The first storage capacitor Cst1 has a capacitance equal to or smaller than a capacitance of the second storage capacitor Cst2.

The first storage capacitor Cst1 is connected between the first liquid crystal capacitor C1c1 and the first storage line SL1, the second storage capacitor Cst2 is connected between the second liquid crystal capacitor C1c2 and the second storage line SL2, the third storage capacitor Cst3 is connected between the third liquid crystal capacitor C1c3 and the second storage line SL2, and the fourth storage capacitor Cst4 is connected between the fourth liquid crystal capacitor C1c4 and the first storage line SL1.

Figure 5:
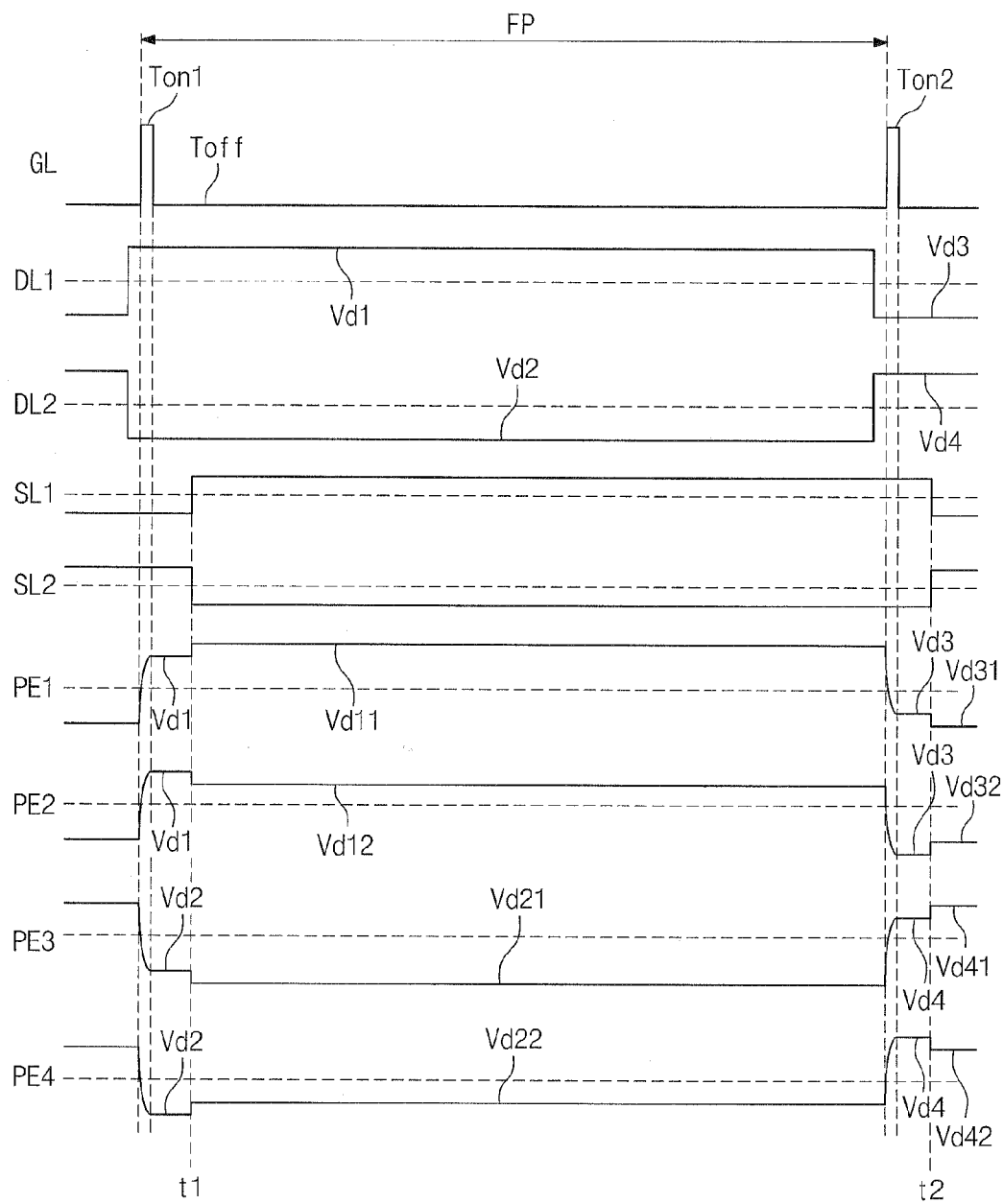
FIG. 5 is a timing diagram showing signals applied to the circuit shown in FIG. 4.

FIG. 5 is a timing diagram showing signals applied to the circuit shown in FIG. 4. FIG. 5 shows a plurality of signal timings included in one frame FP.

Referring to FIGS. 2, 4, and 5, when a first gate-on signal Ton1 is applied to the gate line GL to turn on the first to fourth thin film transistors TR1 to TR4, a first data voltage Vd1 is applied through the first data line DL1 to the first and second pixel electrodes PE1 and PE2, and a second data voltage Vd2 is applied through the second data line DL2 to the third and fourth pixel electrode PE3 and PE4. The first data voltage Vd1 and the second data voltage Vd2 have different polarities from each other with reference to a reference voltage during the same frame, and the polarity of each of the first data voltage Vd1 and the second data voltage Vd2 is inverted every frame.

However, the voltages applied to the first to fourth pixel electrodes PE1 to PE4 are changed by a predetermined amount at a first time point t1 at which the polarities of the voltages applied to the first and second storage lines SL1 and SL2 are inverted. As an example, the voltage having the polarity inverted every frame with respect to the reference voltage is applied to the first and second storage lines SL1 and SL2.

Specifically, since the first pixel electrode PE1 is electrically connected to the first storage line SL1 through the first storage capacitor Cst1, when a voltage having the same polarity as the first data voltage Vd1 is applied to the first storage line SL1, the first data voltage Vd1 applied to the first pixel electrode PE1 is changed to a first pixel voltage Vd11 having a voltage level larger than a voltage level of the first data voltage Vd1 at the first time point t1. Since the second pixel electrode PE2 is electrically connected to the second storage line SL2 through the second storage capacitor Cst2, when a voltage having the polarity opposite to a polarity of the first data voltage Vd1 is applied to the second storage line SL2, the first data voltage Vd1 applied to the second pixel electrode PE2 is changed to a second pixel voltage Vd12 having a voltage level smaller than a voltage level of the first data voltage Vd1 at the first time point t1.

When a voltage having the same polarity as the second data voltage Vd2 is applied to the second storage line SL2, the second data voltage Vd2 applied to the third pixel electrode PE3 is changed to a third pixel voltage Vd21 having a voltage level larger in absolute value than a voltage level of the second data voltage Vd2 at the first time point t1 since the third pixel electrode PE3 is electrically connected to the second storage line SL2 through the third storage capacitor Cst3. When a voltage having the polarity opposite to a polarity of the second data voltage Vd2 is applied to the first storage line SL1, the second data voltage Vd2 applied to the fourth pixel electrode PE4 is changed to a fourth pixel voltage Vd22 having a voltage level smaller in absolute value than a voltage level of the second data voltage Vd2 at the first time point t1 since the fourth pixel electrode PE4 is electrically connected to the first storage line SL1 through the fourth storage capacitor Cst4.

The first to fourth pixel voltages Vd11, Vd12, Vd21, and Vd22 respectively applied to the first to fourth pixel electrodes PE1 to PE4 are maintained until a second gate-on signal Ton2 following the first gate-on signal Ton1 is applied.

When the second gate-on signal Ton2 is applied, a third data voltage Vd3 is applied through the first data line DL1 to the first and second pixel electrodes PE1 and PE2, and a fourth data voltage Vd4 is applied through the second data line DL2 to the third and fourth pixel electrodes PE3 and PE4.

Each of the first and second data lines DL1 and DL2 is applied with a data voltage inverted every frame. The first and third data voltages Vd1 and Vd3 having different polarities from each other and the second and fourth data voltages Vd2 and Vd4 having different polarities from each other are shown in FIG. 5.

After the second gate-on signal Ton2 is applied, the voltages applied to the first to fourth pixel electrodes PE1 to PE4 are changed by a predetermined amount at a second time point t2 at which the polarities of the voltages applied to the first and second storage lines SL1 and SL2 are inverted.

Specifically, since the first pixel electrode PE1 is electrically connected to the first storage line SL1 through the first storage capacitor Cst1, when a voltage having the same polarity as the third data voltage Vd3 is applied to the first storage line SL1, the third data voltage Vd3 applied to the first pixel electrode PE1 is changed to a fifth pixel voltage Vd31 having a voltage level larger in absolute value than a voltage level of the third data voltage Vd3 at the second time point t2. Since the second pixel electrode PE2 is electrically connected to the second storage line SL2 through the second storage capacitor Cst2, when a voltage having the polarity opposite to a polarity of the third data voltage Vd3 is applied to the second storage line SL2, the third data voltage Vd3 applied to the second pixel electrode PE2 is changed to a sixth pixel voltage Vd32 having a voltage level smaller in absolute value than a voltage level of the third data voltage Vd3 at the second time point t2.

When a voltage having the same polarity as the fourth data voltage Vd4 is applied to the second storage line SL2, the fourth data voltage Vd4 applied to the third pixel electrode PE3 is changed to a seventh pixel voltage Vd41 having a voltage level larger than a voltage level of the fourth data voltage Vd4 at the second time point t2 since the third pixel electrode PE3 is electrically connected to the second storage line SL2 through the third storage capacitor Cst3.

When a voltage having the polarity opposite to a polarity of the fourth data voltage Vd4 is applied to the first storage line SL1, the fourth data voltage Vd4 applied to the fourth pixel electrode PE4 is changed to an eighth pixel voltage Vd42 having a voltage level smaller in absolute value than a voltage level of the fourth data voltage Vd4 at the second time point t2 since the fourth pixel electrode PE4 is electrically connected to the first storage line SL1 through the fourth storage capacitor Cst4.

The fifth to eighth pixel voltages Vd31, Vd32, Vd41, and Vd42 respectively applied to the first to fourth pixel electrodes PE1 to PE4 are maintained until a gate-on signal following the second gate-on signal Ton2 is applied.

As described above, the first pixel electrode PE1 receives a relatively high voltage to display a relatively high gray scale, and the second pixel electrode PE2 receives a relatively low voltage to display a relatively low gray scale. Accordingly, the first and second pixel electrodes PE1 and PE2 may serve as the sub-pixels, respectively, while forming one pixel to display an intermediate gray scale between the high gray scale and the low gray scale, thereby improving the viewing angle of the display apparatus 100.

Figure 6A:
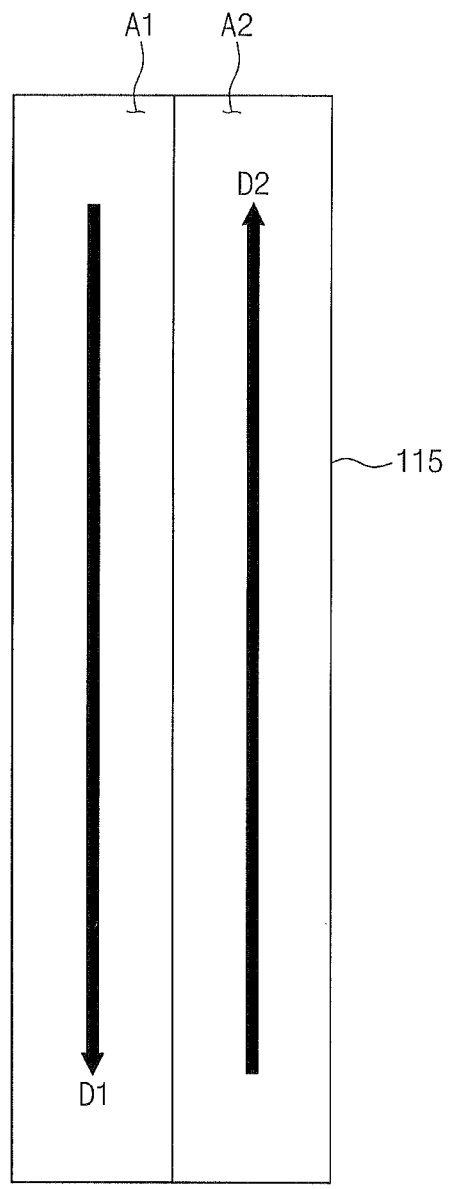
FIG. 6A is a plan view showing alignment directions of a first alignment layer.
Figure 6B:
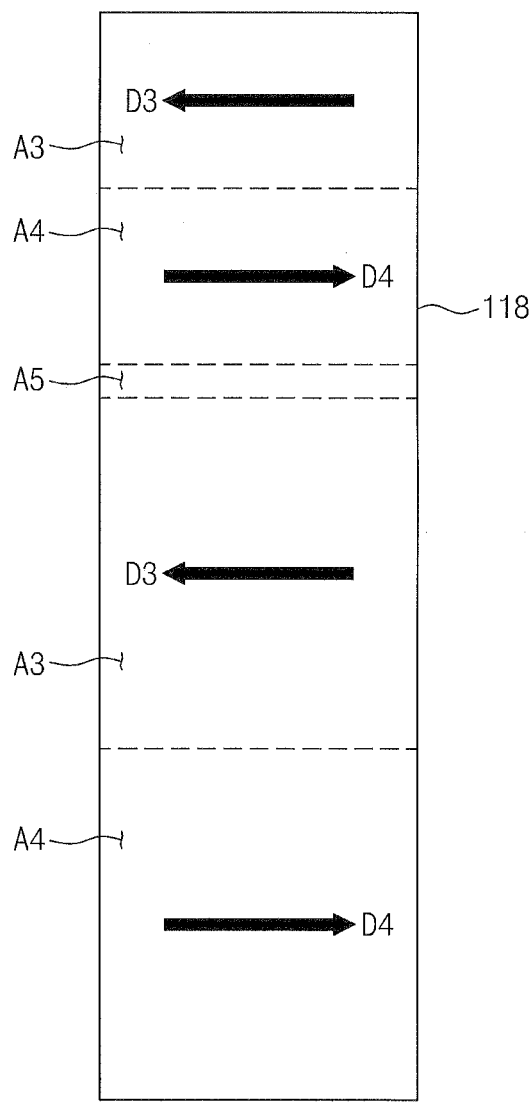
FIG. 6B is a plan view showing alignment directions of a second alignment layer.
Figure 6C:
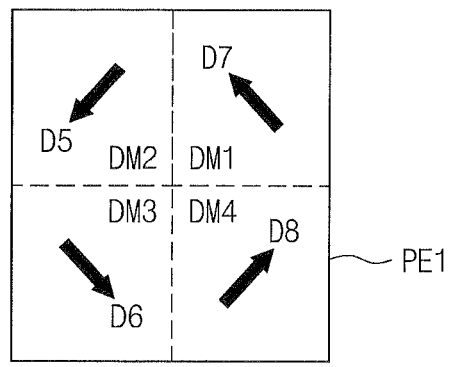
FIG. 6C is a plan view showing first and second pixel electrodes.
Figure 6C:
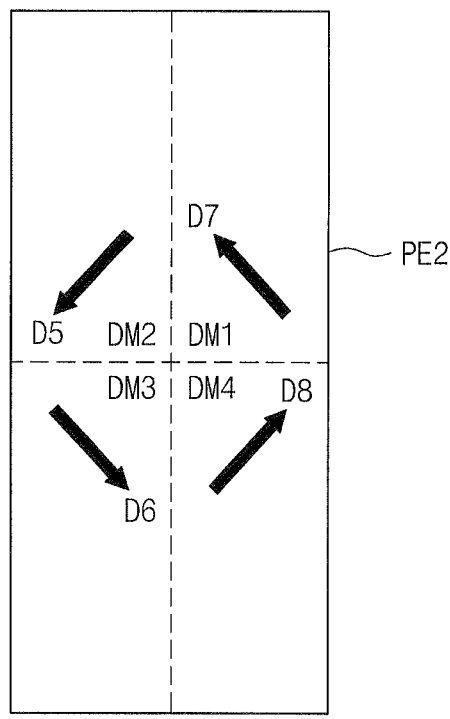
Figure 6C:
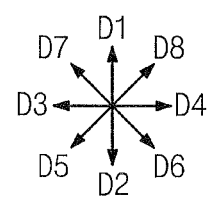

FIG. 6A is a plan view showing alignment directions of a first alignment layer, FIG. 6B is a plan view showing alignment directions of a second alignment layer, and FIG. 6C is a plan view showing first and second pixel electrodes.

Referring to FIGS. 2 and 6A, the first alignment layer 115 is divided into a first alignment area A1 and a second alignment area A2 that respectively correspond to the first and second pixel electrodes PE1 and PE2. The first alignment area A1 is aligned in a first direction D1, and the second alignment area A2 is aligned in a second direction D2 opposite to the first direction D1.

The alignment direction of the first alignment layer 115 is determined by irradiating ultraviolet rays having different polarization directions onto the first alignment layer 115 or by inclinedly irradiating light onto the first alignment layer 115 with respect to a surface of the first alignment layer 115.

Hereinafter, a method of inclinedly irradiating light using a mask is described.

A mask (not shown) having an opening is disposed on the first alignment layer 115 such that the opening corresponds to the first alignment area A1, and the light is irradiated inclinedly onto the first alignment layer 115 to perform a first exposure process on the first alignment area A1. An exposure apparatus (not shown) emitting light irradiates light onto the first alignment area A1 while moving along the first direction D1 when performing the first exposure process. The method of inclinedly irradiating light onto the first alignment layer 115 is performed by tilting the first substrate 101 or the exposure apparatus.

Then, when the mask is disposed on the first alignment layer 115 to correspond the opening to the second alignment area A2, a second exposure process is performed on the second alignment area A2 by inclinedly irradiating light onto the first alignment layer 115. The exposure apparatus (not shown) irradiates light onto the second alignment area A2 while moving along the second direction D2 when performing the second exposure process.

According to an exemplary embodiment, the first alignment layer 115 has been aligned by using a light-aligning method, but the embodiments of the present invention are not limited thereto. For example, according to an embodiment, the first alignment layer 115 is aligned by using a rubbing method or a reactive mesogen.

Referring to FIGS. 2 and 6B, the second alignment layer 118 is divided into the third and fourth alignment areas A3 and A4 corresponding to the first and second pixel electrodes PE1 and PE2, respectively. The third alignment area A3 is aligned in a third direction D3 substantially perpendicular to the first direction D1, and the fourth alignment area A4 is aligned in a fourth direction D4 opposite to the third direction D3.

In FIG. 6B, a fifth alignment area A5 corresponds to an area in which the first and second thin film transistors TR1 and TR2 shown in FIG. 2 are formed when viewed in a plan view. The fifth alignment area A5 is aligned in the same direction as the direction of an adjacent area thereto or not aligned.

The second alignment layer 118 is aligned by methods similar to the alignment methods of the first alignment layer 115.

Referring to FIGS. 2, 4, and 6C, the first substrate 101 and the second substrate 102 are coupled with each other while the liquid crystal layer 103 is interposed between the first and second substrates 101 and 102, so that the first to fourth domains DM1 to DM4 are defined corresponding to each of the first and second pixel electrodes PE1 and PE2. The first domain DM1 is defined by overlapping the second and third alignment areas A2 and A3, the second domain DM2 is defined by overlapping the first and third alignment areas A1 and A3, the third domain DM3 is defined by overlapping the first and fourth alignment areas A1 and A4, and the fourth domain DM4 is defined by overlapping the second and fourth alignment areas A2 and A4.

In the first to fourth domains DM1 to DM4, the liquid crystal molecules in the liquid crystal layer 103 are pre-tilted in different directions from each other. The liquid crystal molecules are pre-tilted in a seventh direction D7, which is obtained by doing a vector sum of the second and third directions D2 and D3, in the first domain DM1, and the liquid crystal molecules are pre-tilted in a fifth direction D5, which is obtained by doing a vector sum of the first and third directions D1 and D3, in the second domain DM2. The liquid crystal molecules are pre-tilted in a sixth direction D6, which is obtained by doing a vector sum of the first and fourth directions D1 and D4, in the third domain DM3, and the liquid crystal molecules are pre-tilted in an eighth direction D8, which is obtained by doing a vector sum of the second and fourth directions D2 an dD4, in the fourth domain DM4.

Thus, the alignment directions of the liquid crystal molecules of the liquid crystal layer 103 are rotated in a counter-clockwise direction in the first to fourth domains DM1 to DM4. As described above, since the liquid crystal molecules are aligned in different directions from each other according to the first to fourth domains DM1 to DM4, the display apparatus 100 may have a wide viewing angle.

However, alignment directions of the first and second alignment layers 115 and 118 are not limited to the alignment directions shown in FIGS. 6A to 6C, and thus the alignment areas and the alignment directions as the above-described may be changed.

Although the exemplary embodiments of the present invention have been described, it is understood that the present invention should not be limited to these exemplary embodiments but various changes and modifications can be made by one ordinary skilled in the art within the spirit and scope of the present invention as hereinafter claimed.

What is claimed is:

1. A display apparatus comprising:
   a first substrate;
   a second substrate facing the first substrate;
   a liquid crystal layer disposed between the first substrate and the second substrate and including liquid crystal molecules; and
   a plurality of pixels, wherein each pixel comprises:
      a gate line extended in a first direction;
      a data line extended in a second direction crossing the first direction;
      a first storage line extended in the first direction and spaced apart from the gate line;
      a second storage line extended in the first direction and spaced apart from the gate line and the first storage line;
      a first switching device electrically connected to the gate line and the data line;
      a second switching device electrically connected to the gate line and the data line;
      a first liquid crystal capacitor connected to the first switching device, the first liquid crystal capacitor including the liquid crystal layer as a dielectric substance;
      a second liquid crystal capacitor connected to the second switching device, the second liquid crystal capacitor including the liquid crystal layer as a dielectric substance;
      a first storage capacitor connected to the first switching device and one of the first and second storage lines;
      a second storage capacitor connected to the second switching device and the other one of the first and second storage lines, wherein the first storage capacitor included in one of two pixels adjacent to each other in the first direction is connected between the first switching device and the first storage line and the first storage capacitor included in a remaining one of the two pixels adjacent to each other in the first direction is connected between the first switching device and the second storage line; and
      a first pixel electrode and a second pixel electrode arranged in the second direction, wherein the gate line is disposed between the first pixel electrode and the second pixel electrode, the first storage line is disposed between the first pixel electrode and the gate line, and the second storage line is disposed between the second pixel electrode and the gate line.

2. The display apparatus of claim 1, wherein a voltage having a positive polarity and a voltage having a negative polarity with respect to a predetermined reference voltage are alternately applied to the first storage line, and a voltage having a negative polarity and a voltage having a positive polarity are alternately applied to the second storage line, wherein the voltages applied to the first storage line and the voltages applied to the second storage line have different polarities from each other.

3. The display apparatus of claim 2, wherein the voltages applied to the first storage line and the voltages applied to the second storage line are alternately applied every frame.

4. The display apparatus of claim 2, wherein, when the first and second switching devices are turned on in response to a gate-on signal applied to the gate line, the first and second liquid crystal capacitors are charged with a first data voltage provided through the data line, the first data voltage charged in the first liquid crystal capacitor is changed to a first pixel voltage larger than the first data voltage according to the voltages applied to the first and second storage lines, and the first data voltage charged in the second liquid crystal capacitor is changed to a second pixel voltage smaller than the first data voltage according to the voltages applied to the first and second storage lines.

5. The display apparatus of claim 2, wherein the first liquid crystal capacitor comprises the first pixel electrode disposed on the first substrate and a common electrode disposed on the second substrate and facing the first pixel electrode while the liquid crystal layer is interposed between the first pixel electrode and the common electrode, and the second liquid crystal capacitor comprises the second pixel electrode disposed on the first substrate and the common electrode disposed on the second substrate and facing the second pixel electrode while the liquid crystal layer is interposed between the second pixel electrode and the common electrode.

6. The display apparatus of claim 5, wherein a capacitance ratio of the second liquid crystal capacitor to the first liquid crystal capacitor is equal to a capacitance ratio of the second storage capacitor to the first storage capacitor.

7. The display apparatus of claim 6, wherein the first storage capacitor has a capacitance equal to or smaller than a capacitance of the second storage capacitor.

8. The display apparatus of claim 5, wherein the first liquid crystal capacitor has a capacitance smaller than a capacitance of the second liquid crystal capacitor.

9. The display apparatus of claim 8, wherein an area ratio of the first pixel electrode and the second pixel electrode is 1:1.5 to 1:2.

10. The display apparatus of claim 5, wherein each of the pixels comprises a first storage electrode branched from the first storage line and a second storage electrode branched from the second storage line, the first switching device comprises a first gate electrode connected to the gate line, a first source electrode connected to the data line, and a first drain electrode facing the first storage electrode, and the second switching device comprises a second gate electrode connected to the gate line, a second source electrode connected to the data line, and a second drain electrode facing the second storage electrode.

11. The display apparatus of claim 10, wherein the first drain electrode and the first storage electrode form the first storage capacitor, the second drain electrode and the second storage electrode form the second storage capacitor, the first and second storage capacitors included in one of the two pixels are respectively connected to the first and second pixel electrodes, and the first and second storage capacitors included in a remaining one of the two pixels are respectively connected to the second and first pixel electrodes.

12. The display apparatus of claim 11, wherein an area in which the first pixel electrode overlaps the first and second storage electrodes is equal to an area in which the second pixel electrode overlaps the first and second storage electrodes.

13. The display apparatus of claim 11, wherein an area in which the first pixel electrode overlaps the first and second drain electrodes is equal to an area in which the second pixel electrode overlaps the first and second drain electrodes.

14. The display apparatus of claim 5, wherein the first substrate comprises a first alignment layer on the first and second pixel electrodes, and the second substrate comprises a second alignment layer on the common electrode, wherein at least one of the first and second alignment layers are aligned in two different directions from each other, and wherein each of the first and second pixel electrodes comprises a plurality of domains which have different alignment directions from each other.

15. The display apparatus of claim 14, wherein each of the first and second alignment layers is aligned in two different directions from each other, and wherein each of the first and second pixel electrodes comprises first, second, third, and fourth domains which have the different alignment directions from each other.

16. The display apparatus of claim 1, wherein at least one of the pixels receives data voltage through corresponding data line and a polarity of the data voltage is inverted.

17. The display apparatus of claim 1, wherein at least one of the pixels comprises:
a shield line extended in the first direction and spaced apart from the first storage line, the second storage line, and the gate line; and
a shield electrode branched from the shield line, disposed between the first pixel electrode and the data line or between the second pixel electrode and the data line, and extended in the second direction,
wherein the shield electrode is applied with a voltage equal to a voltage input to the common electrode.

18. A display apparatus comprising:
a first substrate;
a second substrate facing the first substrate;
a liquid crystal layer disposed between the first substrate and the second substrate, and including liquid crystal molecules; and
a plurality of pixels wherein at least one pixel comprises:
a gate line extended in a first direction;
a first data line extended in a second direction crossing the first direction;
a first storage line extended in the first direction and spaced apart from the gate line;
a second storage line extended in the first direction and spaced apart from the gate line and the first storage line;
a first thin film transistor connected to the gate line and the first data line, the first thin film transistor including a first gate electrode branched from the gate line, a first source electrode branched from the first data line, and a first drain electrode spaced apart from the first source electrode;
a second thin film transistor connected to the gate line and the first data line, the second thin film transistor including a second gate electrode branched from the gate line, a second source electrode connected to the first data line through the first source electrode, and a second drain electrode spaced apart from the second source electrode;

a first pixel electrode connected to the first drain electrode;

a second pixel electrode connected to the second drain electrode; a first storage electrode connected to the first storage line to face the first drain electrode; and a second storage electrode connected to the second storage line to face the second electrode, and wherein a portion of the first pixel electrode is extended to the second storage electrode, and an area in which the portion of the first pixel electrode overlaps the first and second storage electrodes, the first pixel electrode and the second pixel electrode arranged in the second direction, wherein the gate line is disposed between the first pixel electrode and the second pixel electrode, the first storage line is disposed between the first pixel electrode and the gate line, and the second storage line is disposed between the second pixel electrode and the gate line.

19. The display apparatus of claim 18, wherein a portion of the second pixel electrode is extended to the first storage electrode, and an area in which the portion of the second pixel electrode overlaps the first and second storage electrodes.

20. The display apparatus of claim 19, wherein the area of the first pixel electrode overlapped with the first and second storage electrodes is the same or substantially the same as the area of the second pixel electrode overlapped with the first and second storage electrodes.

21. The display apparatus of claim 18, wherein another pixel adjacent to the at least one pixel comprises:

a second data line extended in the second direction crossing the first direction and spaced apart from the first data line;

a third thin film transistor connected to the gate line and the second data line, the third thin film transistor including a third gate electrode branched from the gate line, a third source electrode connected to the second data line, and a third drain electrode spaced apart from the third source electrode;

a fourth thin film transistor connected to the gate line and the second data line, the fourth thin film transistor including a fourth gate electrode branched from the gate line, a fourth source electrode connected between the second data line and the third source electrode, and a fourth drain electrode spaced apart from the fourth source electrode;

a third pixel electrode connected to the third drain electrode;

a fourth pixel electrode connected to the fourth drain electrode;

a third storage electrode connected to the second storage line to face the third drain electrode; and a fourth storage electrode connected to the first storage line to face the fourth electrode.

* * * * *